United States Patent [19]
Witte

[11] Patent Number: 4,942,294
[45] Date of Patent: Jul. 17, 1990

[54] FIBER OPTIC SENSING APPARATUS FOR MULTIPLEXING A PLURALITY OF OPTICAL SIGNALS OF DIFFERENT WAVELENGTHS OVER A SINGLE FIBER OPTIC CABLE

[75] Inventor: James R. Witte, Cincinnati, Ohio

[73] Assignee: General Electric Company, Cincinnati, Ohio

[21] Appl. No.: 192,999

[22] Filed: May 12, 1988

[51] Int. Cl.$^5$ ................................................ H01J 5/16
[52] U.S. Cl. ................................ 250/227.14; 250/226
[58] Field of Search ................ 250/226, 227; 455/610, 455/612

[56] References Cited
U.S. PATENT DOCUMENTS

| | | | |
|---|---|---|---|
| 3,991,318 | 11/1976 | Duguay | 250/578 |
| 4,117,460 | 9/1978 | Walworth et al. | 340/190 |
| 4,223,216 | 10/1980 | Quick et al. | 250/226 |
| 4,281,245 | 7/1981 | Brogardh et al. | 250/227 |
| 4,326,298 | 4/1982 | Fromm et al. | 455/612 |
| 4,356,396 | 10/1982 | Ruell et al. | 250/227 |
| 4,362,358 | 12/1982 | Hafle | 250/227 |
| 4,517,456 | 5/1987 | Halsall et al. | 250/226 |

*Primary Examiner*—David C. Nelms

[57] ABSTRACT

An optical fiber system for gathering and transmitting data about a plurality of operating parameters in an aircraft gas turbine engine is disclosed. Broadband light from a light source is conducted through an optical fiber to a wavelength splitter/combiner which separates the received light signal into a number of discrete output wavelengths. Each wavelength is transmitted to a corresponding optical switch which is responsive to a monitored engine or environmental parameter to reflect all, none or a portion of the received light wavelength. The wavelength splitter/combiner multiplexes the reflected wavelengths into a single signal containing information pertaining to all monitored parameters.

8 Claims, 1 Drawing Sheet

FIBER OPTIC SENSING APPARATUS FOR MULTIPLEXING A PLURALITY OF OPTICAL SIGNALS OF DIFFERENT WAVELENGTHS OVER A SINGLE FIBER OPTIC CABLE

The present invention relates in general to optical sensor apparatus, and more particularly, to an optical sensor system for gathering and transmitting data about a plurality of physical conditions such as position, speed, torque, pressure, temperature, etc. within an aircraft gas turbine engine.

BACKGROUND OF THE INVENTION

Modern aircraft gas turbine engines utilize sophisticated control systems to optimize engine performance and efficiency and remove, as much as possible, work load from the pilot. These control systems require input concerning various engine and environmental parameters for accurate, optimal functioning. In addition, many engine parameters require monitoring to inform the pilot of the correct functioning of the various engine systems and to warn maintenance personnel of any impending system failure or need for maintenance.

Conventional sensing systems include measuring devices positioned at numerous locations about the engine for monitoring the various engine parameters. Electronic transducers or switches associated with the various measuring devices generate electric signals which are conducted along electric cables to the engine control system or monitors. Each switch or transducer may require that two or more wires be routed to it along with associated connectors, connector backshells, harness shielding and lightning protection devices.

The present invention greatly reduces the need for heavy, expensive electrical hardware by substitution of a minimum number of fiber optic devices and cabling. Fiber optic devices are advantageous due to their resistance to the adverse effects of electromagnetic interference and lightning. In addition, a single optic fiber cable can function to transmit a multitude of signals of different frequencies or to transmit signals in opposite directions along the cable without impairment to any of the signals. Thus, the advantages of the present invention are in the elimination of external wiring on the engine, the elimination of electrical cable shielding and lightning protection, reduction in system weight, and circuit simplification.

OBJECTS OF THE INVENTION

It is a primary object of the present invention to provide an apparatus for gathering and transmitting data about a plurality of physical conditions with is not subject to the foregoing disadvantages.

It is an additional object of the present invention to provide a new and improved sensing system having substantially less weight and complexity than conventional sensing systems.

It is a further object of the present invention to provide a new and improved sensing system resistant to electromagnetic interference.

It is also an object of the present invention to provide a new and improved optical sensing system in which a plurality of data signals are frequency multiplexed onto a single optic fiber.

SUMMARY OF THE INVENTION

Disclosed below is an optical sensing system for sensing and transmitting multiple switch type inputs concerning various monitored parameters. Electromagnetic radiation is transmitted via an optical conductor from a broadband light source to a wavelength splitter/combiner. The wavelength splitter/combiner separates the spectral output received from the broadband light source into a number of discrete output wavelengths. Each wavelength is transmitted through an optic fiber cable to an optical switch associated with a monitored engine system. The optical switch reflects all, none or a portion of the transmitted wavelength depending on the value of a sensed parameter. The reflected wavelength is multiplexed together with reflected wavelengths from other optical switches by the wavelength splitter/combiner to form one composite signal.

The composite signal may thereafter be separated into its component wavelengths, each of which reports on a corresponding monitored engine parameter, and converted into electrical signals for final transmission a control system, a monitor, or a storage device.

The above and other objects of the present invention together with the features and advantages thereof will become apparent from the following detailed specification when read in conjuction with the accompanying drawing.

BRIEF DESCRIPTION OF THE DRAWING

The accompanying FIGURE is a simplified illustration of an optical sensing system constructed in accordance with the present invention.

DETAILED DESCRIPTION OF THE INVENTION

Figure 1:
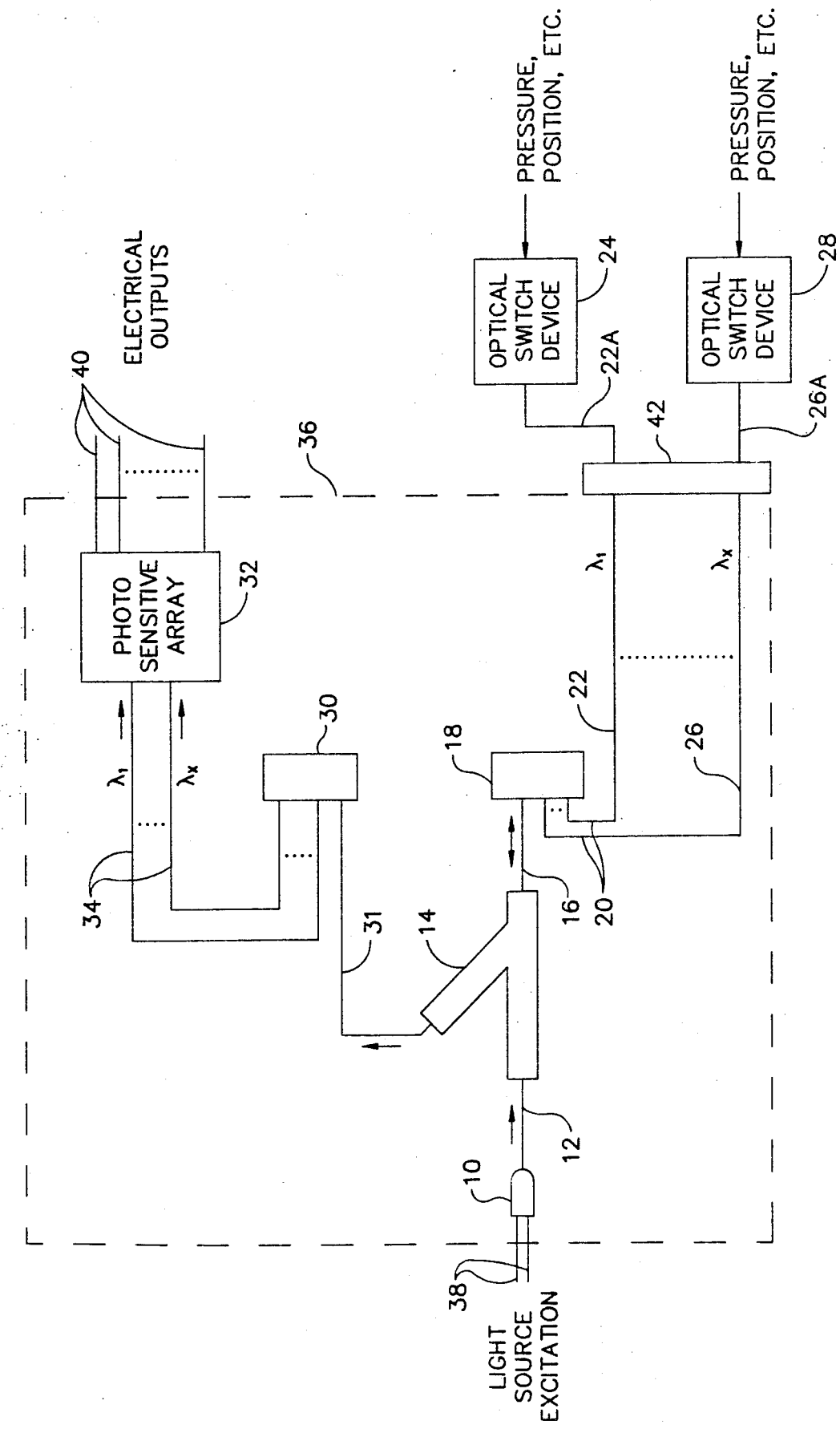

The preferred embodiment of the present invention, as shown in FIG. 1, includes an electromagnetic radiation or light source 10 which emits electromagnetic radiation including wavelengths which are readily transmitted by optical fibers. For purposes of this discussion, the term "light" will be understood to include all electromagnetic radiation wavelengths which can be transmitted by optical fibers. At present, optical fibers are available with can transmit all visible light wavelengths as well as near ultraviolet and infra-red wavelengths.

An optical fiber 12, joins light source 10 to an optical splitter 14. A second optical fiber 16 connects optical splitter 14 to a wavelength splitter/combiner 18. The optical splitter 14 and fibers 12 and 16 are arranged in such a fashion so as to permit the unaltered transmission of light from light source 10 to splitter/combiner 18.

A plurality of optic fibers 20 are connected between splitter/combiner 18 and a plurality of optical switch devices, a single fiber connecting each optical switch device with splitter/combiner 18. For example, device 24 is seen to be connected to splitter/combiner 18 by a single fiber consisting of segments 22 and 22A. Similarly, device 28 is connected to splitter/combiner 18 by the fiber consisting of segments 26 and 26A. Two optical switch devices, 24 and 28, are shown in FIG. 1, however, the system can accommodate many more than the two devices shown. The switch devices are positioned at separate locations about the engine for sensing various engine parameters such as pressure, temperature, position, speed, etc.

Optical splitter 14 is also connected to a second wavelength splitter 30 via optical fiber 31 in a manner which allows the transmission of light signals from splitter/combiner 18 through optical splitter 14 to wavelength splitter 30. A photo sensitive array 32 is coupled to receive the output of wavelength splitter 30.

In operation, light source 10 emits a broadband spectral output which is transmitted through cable 12, optical splitter 14 and cable 16 to wavelength splitter/combiner 18 wherein the light received is separated into a number of discrete output wavelengths or frequencies. Each discrete output wavelength is conducted by a separated one of optic fibers 20 to a separate optical switch device. For example, optic fiber 22 conducts a first wavelength, identified as lambda$_1$ to optical switch device 24. Similarly, optic fiber 26 transmits a second wavelength, identified as lambda$_X$ to a second optical switch device 28. In this manner, a plurality of optical switch devices are each individually provided with a unique wavelength extracted from the multiband light spectrum emitted from light source 10.

Each optical switch device functions to reflect all, none or a portion of the signal received in response to a sensed engine parameter. Some applications will permit the switch device to directly sense an engine parameter while most applications will require the switch to monitor an engine parameter indirectly through an intermediate device. Temperature, for example, may be measured by altering the length of a substance or curvature of a bi-metallic strip so as to partially or totally obstruct light transmission or reflection. The switch devices operate in parallel and may be designed to be interchangeable. Each switch device operates to reflect the particular light wavelength provided to it or to reflect any other wavelength or band of wavelengths provided to it. The interchangeability of the switch devices simplifies maintenance and reduces spare parts requirements.

The reflected signals are transmitted back to wavelength splitter/combiner 18 via the same optic fibers 20 utilized to carry the discrete output frequencies to each switch device. Thus, each one of optic fiber 20 transmits a respective wavelength signal and reflected signal in opposite directions between wavelength splitter/combiner 18 and a respective switch device.

Splitter/combiner 18 combines the reflected signals and outputs a multiplexed signal onto optic fiber 16. Optical splitter 14 directs this multiplexed or composite signal to wavelength splitter 30 through optical fiber 31. Splitter 30 again separates the composite signal into its component wavelengths. Each wavelength is sent to an element within photosensitive array 32. Light striking the sensors is then converted into electrical signals for transmission to an engine control system, a monitor, or a storage device.

The advantage of combining the reflected signals into one composite signal and thereafter re-separating the composite signal into its component wavelengths is that a single optical splitter, 14, functions to direct the plurality of reflected signals, multiplexed into one composite signal, to photosensitive array 32. Optical splitter 14 and wavelength splitter 30 thus eliminate the need for a separate optical splitter corresponding to each one of optical fibers 20 or an additional set of optical cables for conducting the reflected signals from the optical switch devices directly to photosensitive array 32.

Photosensitive array 32 can be connected to wavelength splitter 30 by a plurality of optic fibers 34, as shown in FIG. 1, wherein each individual fiber transmits a discrete output wavelength. Alternatively, array 32 can be directly mounted to wavelength splitter 30.

The installation of the above-described system in an electronic chassis presents an additional problem. The use of fiber optics in a wired control would normally require the use of optical connectors in the chassis to provide separation of the optical electronics boards from the chassis for manufacturing and test regions. To address this problem, the above described optical devices, with the exception of the optical switch devices, can be assembled together as a connector module 36 with power leads 38 for light source 10 going into the module and return signal leads 40 from photosensitive array 32 coming out. The optical switch devices are shown to be connected to module 36 by optical fibers, such as fibers 22A and 26A, and an optical connector 42. Within module 36, optical connector 42 is connected with wavelength splitter-combiner 18 by optical fibers 20. There exists, however, only one optical transmission path between wavelength splitter/combiner 18 and each individual optical switch device. For example, switch device 24 is connected to wavelength splitter/combiner 18 by optical fiber segments 22 and 22A which are joined at connector 42.

The signals reflected by the optical switch devices can be bivalued wherein no reflection indicates a first state of a sensed parameter and full reflection indicates that a second state. Alternatively, the amount of signal reflection can vary between no reflection and complete reflection so as to represent several values of the sensed parameter. The system can also allow for detection of a failed fiber in the optical leads to a switch device by requiring that the switch device always reflect a portion of signal provided to it. An absence of a reflected signal would therefor indicate a cable or device failure.

Several advantages of this invention are readily apparent. The system presented above is less complex than conventional electrical sensing systems and does not require the cable shielding and lightning protection associated with electrical systems. The light weight of optical devices and fibers, relative to electrical hardware, permits a beneficial reduction in an aircraft engine's weight.

From the foregoing specification it will be clear to those skilled in the art that the present invention is not limited to the specific embodiment described and illustrated and that numerous modifications and changes are possible without departing from the scope of the present invention. For example, the invention as described above uses a single light source which emits a broadband spectral output. The minimum breadth of the output waveband is that which just includes all the wavelengths selected for the optical switch devices. More than one light emitter may be employed, however, all injecting light into the same optic fiber. The light signal created thereby may have a discontinuous spectrum consisting only of the discrete light wavelengths which will later be separated out and transmitted to the optical switch devices. Additionally, optical components located within modular assembly 36 may be combined or directly affixed to one another thereby eliminating optical fiber cabling within the modular assembly.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:

1. An optical sensing system, comprising:
   an electromagnetic radiation source emitting broadband electromagnetic radiation;
   plurality of optical switch devices, each of said switch devices being responsive to physical conditions applied to it to modify and reflect electromagnetic radiation supplied to it;
   a wavelength splitter/combiner for receiving said broadband electromagnetic radiation and separation said broadband radiation into a plurality of selected wavelengths, said wavelength splitter/combiner further including means for combining electromagnetic radiation reflected from said switch devices into one composite signal;
   a plurality of optical fiber conductors, a separate conductor corresponding to each one of said plurality of optical switch devices, each of said conductor functioning to transmit a selected wavelength from said splitter/combiner to said conductor's corresponding switch device and to transmit reflected radiation from said conductor's corresponding switch device to said splitter/combiner;
   an optical conductor for transmitting radiation from said radiation source to said wavelength splitter/combiner and for transmitting said composite signal from said splitter/combiner; and
   means for extracting said composite signal from said last-recited optical conductor.

2. The optical sensing system according to claim 1, further comprising:
   means for separating said composite signal into its component wavelengths; and
   means connected to receive the component wavelengths from said separating means for detecting modifications made to each wavelength by said optical switch devices.

3. The optical sensing system according to claim 2, wherein said means for extracting said composite signal comprising an optical splitter interposed in the path of said last-recited optical conductor for redirecting transmission of said composite signal to said separating means.

4. The optical sensing system according to claim 2, wherein said separating means comprises a second wavelength splitter/combiner.

5. The optical sensing system according to claim 2 wherein said means for detecting modifications made to each wavelength by said optical switch devices includes a photosensitive array connected to receive the component wavelengths from said separating means, each component wavelength being directed to a different element within said array, each of said elements being responsive to incident electromagnetic radiation to generate an electrical signal.

6. An optical sensing system according to claim 1, wherein said broadband electromagnetic radiation includes visible light wavelengths and said selected wavelengths correspond to distinct colors of the light spectrum.

7. The optical sensing system according to claim 1, wherein said broadband electromagnetic radiation includes only said selected wavelengths.

8. In an aircraft gas turbine engine, and optical system for gathering and transmitting data about a plurality of physical conditions, the system comprising:
   a light source emitting broadband light including wavelengths which are readily transmitted by optical fibers;
   a plurality of optical switch devices, each of said switch devices being responsive to physical conditions applied to it to modify and reflect light supplied to it;
   a wavelength splitter/combiner for receiving said broadband light and separating said light into a plurality of selected wavelengths, said wavelength splitter/combiner further including means for combining light reflected from said switch devices into one signal;
   a plurality of optical fiber conductors, a separate conductor corresponding to each one of said plurality of optical switch devices, each one of said conductors functioning to transmit a selected wavelength from said splitter/combiner to said conductor's respective switch device and to transmit reflected light to said splitter/combiner;
   an optical fiber conductor for transmitting light from said light source to said wavelength splitter/combiner and for transmitting said composite signal from said splitter/combiner;
   an optical splitter interposed in the path of said optical fiber conductor for redirecting transmission of said composite signal;
   a second wavelength splitter/combiner for separating said composite signal into its component wavelengths; and
   a photosensitive array connected to receive the component wavelengths from said second wavelength splitter/combiner, each component wavelength being directed to a different element within said array, each of said elements being responsive to incident light to gerate an electrical signal.

* * * * *